(12) United States Patent
Zhang et al.

(10) Patent No.: US 12,245,180 B2
(45) Date of Patent: Mar. 4, 2025

(54) METHOD AND NETWORK DEVICE FOR LOCATING CLOCK FAULT

(71) Applicant: Huawei Technologies Co., Ltd., Shenzhen (CN)

(72) Inventors: Yawei Zhang, Beijing (CN); Jingfei Lv, Wuhan (CN); Yong Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 17/827,189

(22) Filed: May 27, 2022

(65) Prior Publication Data

US 2022/0286989 A1   Sep. 8, 2022

Related U.S. Application Data

(63) Continuation of application No. PCT/CN2020/132816, filed on Nov. 30, 2020.

(30) Foreign Application Priority Data

Nov. 29, 2019  (CN) .......................... 201911206257.1
Jan. 9, 2020   (CN) .......................... 202010023012.1

(51) Int. Cl.
  *H04W 56/00*   (2009.01)
  *H04J 3/06*    (2006.01)
  *H04L 41/0677* (2022.01)

(52) U.S. Cl.
  CPC ....... *H04W 56/0035* (2013.01); *H04J 3/0697* (2013.01); *H04L 41/0677* (2013.01); *H04W 56/001* (2013.01)

(58) Field of Classification Search
  CPC ...... H04J 3/0641; H04J 3/0676; H04J 3/0697; H04L 41/0677; H04L 69/28;
  (Continued)

(56) References Cited

U.S. PATENT DOCUMENTS

2010/0002679 A1* 1/2010 Zhang ............... H04W 56/0035
                                                    370/350
2011/0274227 A1* 11/2011 Suemitsu ................ H04L 69/28
                                                    375/362
(Continued)

FOREIGN PATENT DOCUMENTS

CN    1578197 A    2/2005
CN    1855784 A    11/2006
(Continued)

OTHER PUBLICATIONS

ITU-T G.8262/Y.1362, "Series G: Transmission Systems and Media, Digital Systems and Networks Packet over Transport aspects—Synchronization, quality and availability targets, Series Y: Global Information Infrastructure, Internet Protocol Aspects and Next-Generation Networks Internet protocol aspects—Transport, Timing characteristics of synchronous Ethernet equipment slave clock," Jan. 2015, 38 pages.

(Continued)

*Primary Examiner* — Pao Sinkantarakorn
(74) *Attorney, Agent, or Firm* — Conley Rose, P.C.

(57) ABSTRACT

A method for locating a clock fault includes that a network device locates a clock fault source based on whether first frequency offsets between a plurality of input clocks and a local clock exceed a frequency offset threshold, or based on whether second frequency offsets between the input clocks exceed a relative frequency offset threshold.

18 Claims, 10 Drawing Sheets

(58) Field of Classification Search
CPC .......... H04W 56/001; H04W 56/0015; H04W 56/002; H04W 56/0035
See application file for complete search history.

(56) References Cited

U.S. PATENT DOCUMENTS

| | | | | |
|---|---|---|---|---|
| 2012/0087453 | A1* | 4/2012 | Gao | H04J 3/0688 375/356 |
| 2013/0227172 | A1 | 8/2013 | Zheng et al. | |
| 2014/0270805 | A1* | 9/2014 | Mani | H04J 3/0667 398/155 |
| 2015/0092793 | A1* | 4/2015 | Aweya | H04J 3/0667 370/503 |
| 2017/0187481 | A1 | 6/2017 | Huang et al. | |

FOREIGN PATENT DOCUMENTS

| | | |
|---|---|---|
| CN | 102833026 A | 12/2012 |
| CN | 104518839 A | 4/2015 |
| CN | 104660359 A | 5/2015 |
| CN | 105589506 A | 5/2016 |
| CN | 108282243 A | 7/2018 |
| EP | 0986785 B1 | 7/2003 |
| EP | 2424291 A1 | 2/2012 |
| JP | H0629914 A | 2/1994 |
| JP | 3069983 U | 7/2000 |
| JP | 2010004321 A | 1/2010 |
| JP | 2013110523 A | 6/2013 |
| WO | 9855923 A3 | 12/1998 |
| WO | 2014161711 A1 | 10/2014 |
| WO | 2019233386 A1 | 12/2019 |

OTHER PUBLICATIONS

ITU-T G.8262/Y.1362, Nov. 2018, "Series G: Transmission Systems and Media, Digital Systems and Networks, Packet over Transport aspects—Synchronization, quality and availability targets, Series Y: Global Information Infrastructure, Internet Protocol Aspects, Next-Generation Networks, Internet of Things and Smart Cities, Internet protocol aspects—Transport, Timing characteristics of synchronous equipment slave clock," 44 pages.

ITU-T G.811, Sep. 1997, "Series G: Transmission Systems and Media, Digital Systems and Networks, Digital transmission systems—Digital networks—Design objective for digital networks, Timing characteristics of primary reference clocks," 11 pages.

* cited by examiner

METHOD AND NETWORK DEVICE FOR LOCATING CLOCK FAULT

CROSS-REFERENCE TO RELATED APPLICATIONS

This is a continuation of International Patent Application No. PCT/CN2020/132816 filed on Nov. 30, 2020, which claims priority to Chinese Patent Application No. 201911206257.1 filed on Nov. 29, 2019 and Chinese Patent Application No. 202010023012.1 filed on Jan. 9, 2020. All of the aforementioned patent applications are hereby incorporated by reference in their entireties.

TECHNICAL FIELD

The present disclosure relates to the communications field, and in particular, to a method and a network device for locating a clock fault.

BACKGROUND

In the field of mobile communications, a clock of a wireless base station requires frequency synchronization to ensure that a service runs normally. Precision of frequency synchronization required by a wireless service is ±0.05 parts per million (ppm). As shown in FIG. 1, in a mobile bearer network, a clock server transfers a clock to a base station for frequency synchronization through a mobile bearer device 1, a mobile bearer device 2, and a mobile bearer device 3. A physical layer synchronization technology or a Precision Timing Protocol (PTP) synchronization technology may be used to provide a frequency synchronization solution for the base station.

However, when a clock is faulty, it is difficult to determine the faulty clock.

SUMMARY

This disclosure provides a method for locating a clock fault, to locate a faulty clock based on received frequency offsets of a plurality of clocks.

According to a first aspect, a method for locating a clock fault is provided, including that a network device obtains frequency offsets between at least two clocks and a local clock. When a first condition is met, the network device determines that the local clock is faulty, where the first condition includes that a first quantity is greater than a second quantity, the first quantity is a quantity of clocks that are in the at least two clocks and whose frequency offsets relative to the local clock exceed a frequency offset threshold, and the second quantity is a quantity of clocks that are in the at least two clocks and whose frequency offsets relative to the local clock do not exceed the frequency offset threshold, and/or when a second condition is met, the network device determines that a first clock in the at least two clocks is faulty, where the second condition includes that a frequency offset between the first clock and the local clock exceeds the frequency offset threshold, and a frequency offset between the local clock and each clock in the at least two clocks other than the first clock does not exceed the frequency offset threshold.

According to the method for locating a clock fault provided in the first aspect, the network device determines that the local clock is faulty by determining that the quantity of clocks that are in the received at least two clocks and whose frequency offsets relative to the local clock exceed the frequency offset threshold is greater than the quantity of clocks whose frequency offsets relative to the local clock do not exceed the frequency offset threshold. The network device determines, by determining that a clock that is in the received at least two clocks and whose frequency offsets relative to the local clock exceed the frequency offset threshold, and frequency offsets of other clocks relative to the local clock do not exceed the frequency offset threshold, that the clock whose frequency offset relative to the local clock exceeds the frequency offset threshold is faulty. The local clock may be a clock generated by a local crystal oscillator in a network device. The received at least two clocks may be all clocks received by the network device, or may be a part of all clocks received by the network device. For example, it is assumed that the network device receives 50 clocks in total. The received at least two clocks may be 40 of the 50 clocks, or all the 50 clocks. In this way, the network device may locate a fault source, to be specific, determine whether the local clock is faulty or a received clock is faulty.

In a possible implementation of the first aspect, that a first quantity is greater than a second quantity in the first condition may be that the second quantity is 0 and the first quantity is a quantity of the at least two clocks. It may also be understood that, if a frequency offset between the local clock and each clock that is received by the network device exceeds the frequency offset threshold, the network device determines that the local clock is faulty.

In a possible implementation of the first aspect, the at least two clocks include three or more clocks. The network device generally has a plurality of ports, and each port may receive a clock sent by another device.

In a possible implementation of the first aspect, the frequency offset threshold is ±4.6 ppm. According to a requirement of the International Telecommunication Union (ITU)-Telecommunication Standardization Sector (ITU-T) G.8262, a frequency offset of a mobile bearer device relative to a standard clock (such as a Global Positioning System (GPS) clock) should not exceed ±4.6 ppm. The frequency offset threshold in the first aspect may be referred to as a frequency offset threshold of the network device, or referred to as a frequency offset detection threshold of the mobile bearer device.

In a possible implementation of the first aspect, the network device is a device that supports physical layer clock synchronization or a device that supports precision time protocol synchronization. In this way, the method provided in the first aspect may be widely applied to a network that requires physical layer clock synchronization or precise time protocol synchronization, for example, a mobile bearer network or an electric power network.

In a possible implementation of the first aspect, the network device generates an alarm, where the alarm indicates a clock fault source. After locating the clock fault source, the network device generates the alarm to notify a network management system of a cause of the clock fault.

According to a second aspect, a method for locating a clock fault is provided, including when a condition is met, a network device determines that a first clock is faulty. The condition includes that a frequency offset between the first clock and each of other clocks in a plurality of clocks exceeds a relative frequency offset threshold, and the first clock is one of the plurality of clocks.

According to the method provided in the second aspect, the network device determines, by determining that a clock that is in received at least three clocks and whose frequency offset relative to each of other clocks exceeds the relative frequency offset threshold, that the clock whose frequency offset relative to each of other clocks exceeds the relative frequency offset threshold is faulty. It should be understood that the received at least three clocks may be all clocks received by the network device, or may be a part of all clocks received by the network device. For example, it is assumed that the network device receives 50 clocks in total. The received at least three clocks may be 40 of the 50 clocks, or all the 50 clocks.

In this way, even if a frequency offset between the local clock and each of a plurality of clocks received by the network device does not exceed a frequency offset threshold of the network device, the network device may still locate that a fault source is a received clock. It should be understood that "a plurality of clocks" herein means three or more clocks.

In a possible implementation of the second aspect, the condition further includes that none of the frequency offsets between the other clocks exceeds the relative frequency offset threshold. The "frequency offsets between the other clocks" herein means that a frequency offset between any two clocks in the other clocks. In this way, it can be more accurately determined that only the first clock is faulty.

In a possible implementation of the second aspect, the relative frequency offset threshold is ±4.44 parts per billion (ppb). The relative frequency offset threshold may also be referred to as a frequency offset detection threshold of a reference clock source, or a frequency offset detection threshold of a clock source. Because 1 ppm=1000 ppb, this solution can locate the fault source while greatly improving precision of detecting a frequency offset of the reference clock source.

In a possible implementation of the second aspect, the network device is a device that supports physical layer clock synchronization or a device that supports precision time protocol synchronization. In this way, the method provided in the second aspect may be widely applied to a network that requires physical layer clock synchronization or precise time protocol synchronization, for example, a mobile bearer network or an electric power network.

In a possible implementation of the second aspect, the network device generates an alarm, where the alarm indicates that the first clock is faulty. After determining that a received clock is faulty, the network device generates an alarm to notify a network management system that the clock is faulty.

According to a third aspect, a network device for locating a clock fault is provided. The network device includes an obtaining unit, and further includes a first determining unit and/or a second determining unit. The obtaining unit is configured to obtain frequency offsets between at least two clocks and a local clock. The first determining unit is configured to, when a first condition is met, determine that the local clock is faulty. The first condition includes that a first quantity is greater than a second quantity, the first quantity is a quantity of clocks that are in the at least two clocks and whose frequency offsets relative to the local clock exceed a frequency offset threshold, and the second quantity is a quantity of clocks that are in the at least two clocks and whose frequency offsets relative to the local clock do not exceed the frequency offset threshold. The second determining unit is configured to determine whether a second condition is met. The second condition includes that a frequency offset between a first clock in the at least two clocks and the local clock exceeds the frequency offset threshold, and a frequency offset between the local clock and each clock in the at least two clocks other than the first clock does not exceed the frequency offset threshold.

In a possible implementation of the third aspect, that a first quantity is greater than a second quantity is that the second quantity is 0 and the first quantity is a quantity of the at least two clocks.

In a possible implementation of the third aspect, the at least two clocks include three or more clocks.

In a possible implementation of the third aspect, the frequency offset threshold is ±4.6 ppm.

In a possible implementation of the third aspect, the network device is a device that supports physical layer clock synchronization or a device that supports precision time protocol synchronization.

In a possible implementation of the third aspect, the network device further includes an alarm unit, configured to generate an alarm, where the alarm indicates a clock fault source.

For beneficial effects of any one of the third aspect or the possible implementations of the third aspect, refer to corresponding description of beneficial effects of any one of the first aspect or the possible implementations of the first aspect.

According to a fourth aspect, a network device for locating a clock fault is provided. The network device includes a judgment unit. The judgment unit is configured to determine whether a condition is met. The condition includes that a frequency offset between the first clock and each of other clocks in a plurality of clocks exceeds a relative frequency offset threshold, and the first clock is one of the plurality of clocks. The network device further includes a determining unit, configured to, when the judgment unit determines that the condition is met, determine that the first clock is faulty.

In a possible implementation of the fourth aspect, the condition further includes that none of the frequency offsets between the other clocks exceeds the relative frequency offset threshold.

In a possible implementation of the fourth aspect, the relative frequency offset threshold is ±4.44 ppb.

In a possible implementation of the fourth aspect, the network device is a device that supports physical layer clock synchronization or a device that supports precision time protocol synchronization.

In a possible implementation of the fourth aspect, the network device generates an alarm, where the alarm indicates that the first clock is faulty.

For beneficial effects of any one of the fourth aspect or the possible implementations of the fourth aspect, refer to corresponding description of beneficial effects of any one of the second aspect or the possible implementations of the second aspect.

According to a fifth aspect, a network device for locating a clock fault is provided. The network device includes an interface, a clock circuit, and a processor. The interface is configured to receive at least two clocks. The clock circuit is configured to obtain frequency offsets between the at least two clocks and a local clock. The processor is configured to, when a first condition is met, determine that the local clock is faulty, where the first condition includes that a first quantity is greater than a second quantity, the first quantity is a quantity of clocks that are in the at least two clocks and whose frequency offsets relative to the local clock exceed a frequency offset threshold, and the second quantity is a quantity of clocks that are in the at least two clocks and whose frequency offsets relative to the local clock do not exceed the frequency offset threshold, and/or when a second condition is met, determine that a first clock in the at least two clocks is faulty, where the second condition includes that a frequency offset between the first clock and the local clock exceeds the frequency offset threshold, and a frequency offset between the local clock and each clock in the at least two clocks other than the first clock does not exceed the frequency offset threshold.

In a possible implementation of the fifth aspect, that a first quantity is greater than a second quantity is that the second quantity is 0 and the first quantity is a quantity of the at least two clocks.

In a possible implementation of the fifth aspect, the at least two clocks include three or more clocks.

In a possible implementation of the fifth aspect, the frequency offset threshold is ±4.6 ppm.

In a possible implementation of the fifth aspect, the network device is a device that supports physical layer clock synchronization or a device that supports precision time protocol synchronization.

In a possible implementation of the fifth aspect, the processor is further configured to generate an alarm, where the alarm indicates a clock fault source.

For beneficial effects of any one of the fifth aspect or the possible implementations of the fifth aspect, refer to corresponding description of beneficial effects of any one of the first aspect or the possible implementations of the first aspect.

According to a sixth aspect, a network device for locating a clock fault is provided, including an interface and a processor. The interface is configured to receive a plurality of clocks. The processor is configured to, when a condition is met, determine that a first clock is faulty. The condition includes that a frequency offset between the first clock and each of other clocks in the plurality of clocks exceeds a relative frequency offset threshold, and the first clock is one of the plurality of clocks.

In a possible implementation of the sixth aspect, the condition further includes that none of the frequency offsets between the other clocks exceeds the relative frequency offset threshold.

In a possible implementation of the sixth aspect, the relative frequency offset threshold is ±4.44 ppb.

In a possible implementation of the sixth aspect, the network device is a device that supports physical layer clock synchronization or a device that supports precision time protocol synchronization.

In a possible implementation of the sixth aspect, the processor is further configured to generate an alarm, where the alarm indicates that the first clock is faulty.

For beneficial effects of any one of the sixth aspect or the possible implementations of the sixth aspect, refer to corresponding description of beneficial effects of any one of the second aspect or the possible implementations of the second aspect.

According to a seventh aspect, a computer-readable storage medium including instructions is provided. When the instructions are run on a computer, the computer is enabled to perform the following one or more steps: when a first condition is met, determining that a local clock of a network device is faulty, where the first condition includes that a first quantity is greater than a second quantity, the first quantity is a quantity of clocks that are in at least two clocks and whose frequency offsets relative to the local clock exceed a frequency offset threshold, and the second quantity is a quantity of clocks that are in the at least two clocks and whose frequency offsets relative to the local clock do not exceed the frequency offset threshold, when a second condition is met, determining that a first clock in the at least two clocks is faulty, where the second condition includes that a frequency offset between the first clock and the local clock exceeds the frequency offset threshold, and a frequency offset between the local clock and each clock in the at least two clocks other than the first clock does not exceed the frequency offset threshold, and/or when a third condition is met, determining that a second clock is faulty, where the third condition includes that a frequency offset between the second clock and each of other clocks in a plurality of clocks exceeds a relative frequency offset threshold, and the second clock is one of the plurality of clocks.

In a possible implementation of the seventh aspect, the frequency offset threshold is ±4.6 ppm, and the relative frequency offset threshold is ±4.44 ppb.

In a possible implementation of the seventh aspect, that a first quantity is greater than a second quantity in the first condition includes that the second quantity is 0 and the first quantity is a quantity of the at least two clocks.

In a possible implementation of the seventh aspect, the third condition further includes that none of the frequency offsets between the other clocks exceeds the relative frequency offset threshold.

In a possible implementation of the seventh aspect, the network device is a device that supports physical layer clock synchronization or a device that supports precision time protocol synchronization.

In a possible implementation of the seventh aspect, the instructions further enable the computer to generate an alarm after determining a clock fault source, where the alarm indicates a clock source.

According to the solutions provided in this disclosure, the network device (for example, a device that supports physical layer clock synchronization or a device that supports precision time protocol synchronization) may determine, in several cases of determining whether frequency offset values between received at least two clocks and a local clock exceed a frequency offset threshold, whether the local clock of the network device is faulty, or a received clock is faulty. The network device may alternatively determine, by comparing frequency offsets between the received three or more clocks, whether a clock in the received clocks is faulty. A determining precision may be far higher than ±4.6 ppm. In addition, after a clock fault source is located, an alarm may be generated to indicate the clock fault source.

DESCRIPTION OF EMBODIMENTS

To describe technical solutions in the present disclosure more clearly, the following briefly describes the accompanying drawings used in the embodiments. Apparently, the accompanying drawings in the following description merely show some embodiments of the present disclosure, and a person of ordinary skill in the art can derive other technical solutions and accompanying drawings from these accompanying drawings without creative efforts.

A device A sends a clock to a device B, and the device A is a reference clock source of the device B. Based on a requirement of the ITU-T G.811 standard, a long-term frequency offset of a clock of a clock server device relative to a standard clock (for example, a GPS clock) should not exceed 0.01 ppb (namely, $\pm 10^{-5}$ ppm). Based on a requirement of the ITU-T G.8262 standard, a frequency offset of a local clock of a mobile bearer device relative to the standard clock (for example, the GPS clock) does not exceed $\pm 4.6$ ppm. Therefore, for the mobile bearer device, precision of a frequency offset detection threshold is set not to exceed $\pm 4.6$ ppm. "$\pm$" indicates a range herein. $\pm 4.6$ ppm is used as an example. It is considered that precision that is greater than +4.6 ppm or less than "−4.6 ppm" exceeds the threshold. The mobile bearer device is a device in a mobile bearer network, and the mobile bearer network may generally include a mobile backhaul network and a mobile fronthaul network.

Figure 1:
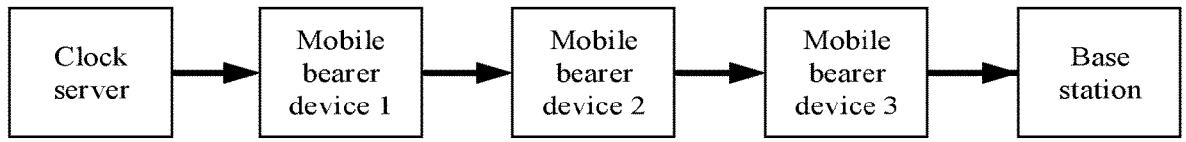
FIG. 1 is a schematic diagram of clock transfer in a mobile bearer network.
Figure 2:
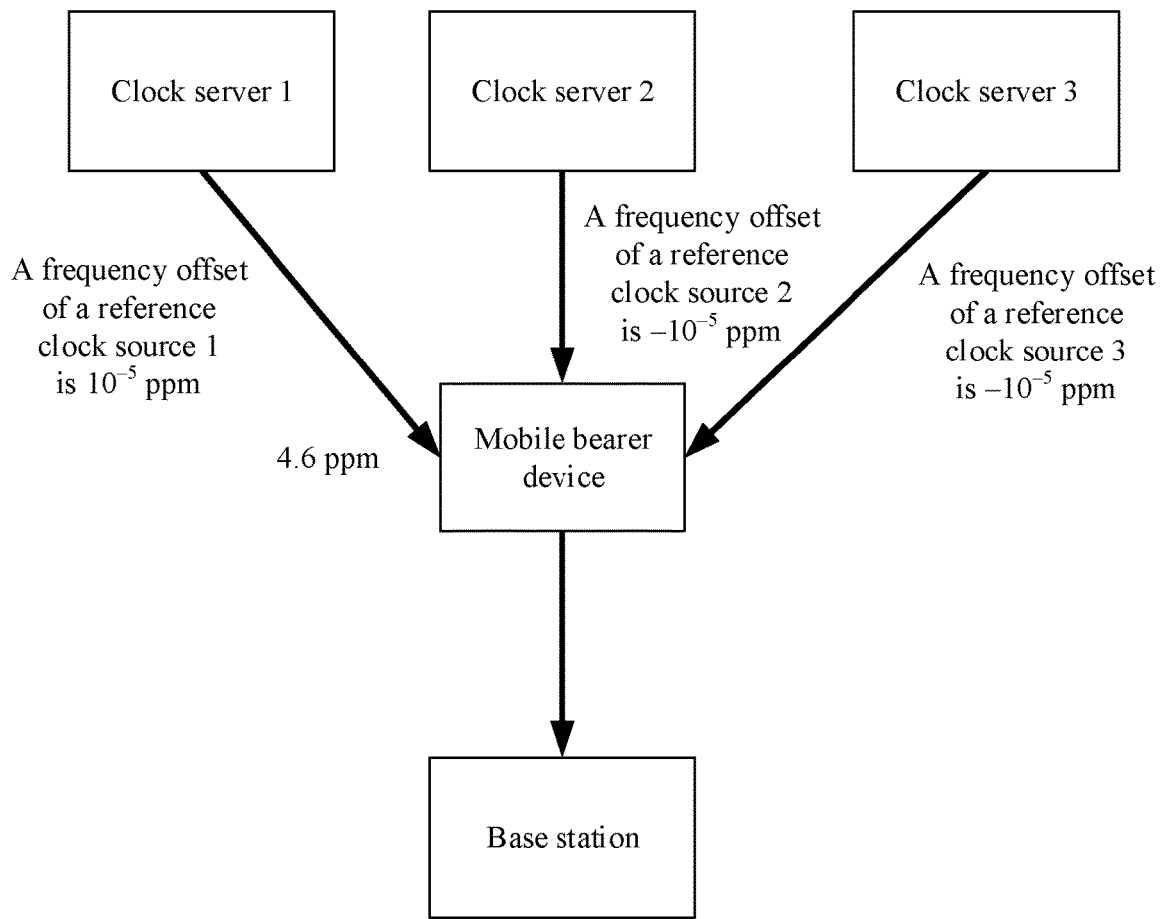
FIG. 2 is a schematic diagram of clock frequency offset precision specified by a standard organization.

As shown in FIG. 2, clock servers 1 to 3 send clocks to a mobile bearer device separately, and the clock servers 1 to 3 each are a reference clock source of the mobile bearer device. A long-term frequency offset of the clock server 1 relative to a standard clock is $10^{-5}$ ppm (in other words, a frequency offset of a reference clock source 1 of the mobile bearer device is $10^{-5}$ ppm). A long-term frequency offset of the clock of the clock server 2 relative to the standard clock and a long-term frequency offset of the clock of the clock server 3 relative to the standard clock are $-10^{-5}$ ppm. The frequency offsets of the three clock servers relative to the standard clock do not exceed the threshold, and meet the requirement of the ITU-T G.811. The frequency offset of the clock of the mobile bearer device relative to the standard clock is 4.6 ppm, and meets the requirement of the ITU-T G.8262.

When the mobile bearer device detects that a frequency offset of a clock (or an input clock) received through a port of the mobile bearer device relative to a local clock of the mobile bearer device exceeds a threshold (for example, $\pm 4.6$ ppm), the mobile bearer device cannot determine whether the clock input through the port is faulty or the local clock of the mobile bearer device is faulty. Herein, the local clock may be a clock generated by a local crystal oscillator of the mobile bearer device. In this disclosure, sending a clock includes sending a clock signal, and receiving a clock includes receiving a clock signal.

The present disclosure provides a technical solution for locating a clock fault. In a general scenario, the mobile bearer device has at least two reference clock sources. In an implementation provided in this embodiment of the present disclosure, a specific device whose clock is faulty may be determined according to a majority decision principle. It should be noted that this solution is not limited to being applied to the mobile bearer device. This solution may be applied to a device that supports physical layer clock synchronization or a device that supports precision time protocol synchronization (for example, a router, a switch, or a packet switching device). The mobile bearer device is one of the devices. For example, this solution is not only applicable to a device that supports physical layer clock synchronization or a device that supports precision time protocol synchronization in a mobile bearer network, but also applicable to a device that supports physical layer clock synchronization or a device that supports precision time protocol synchronization in an electric power network. A design idea of the solution is as follows.

Figure 4:
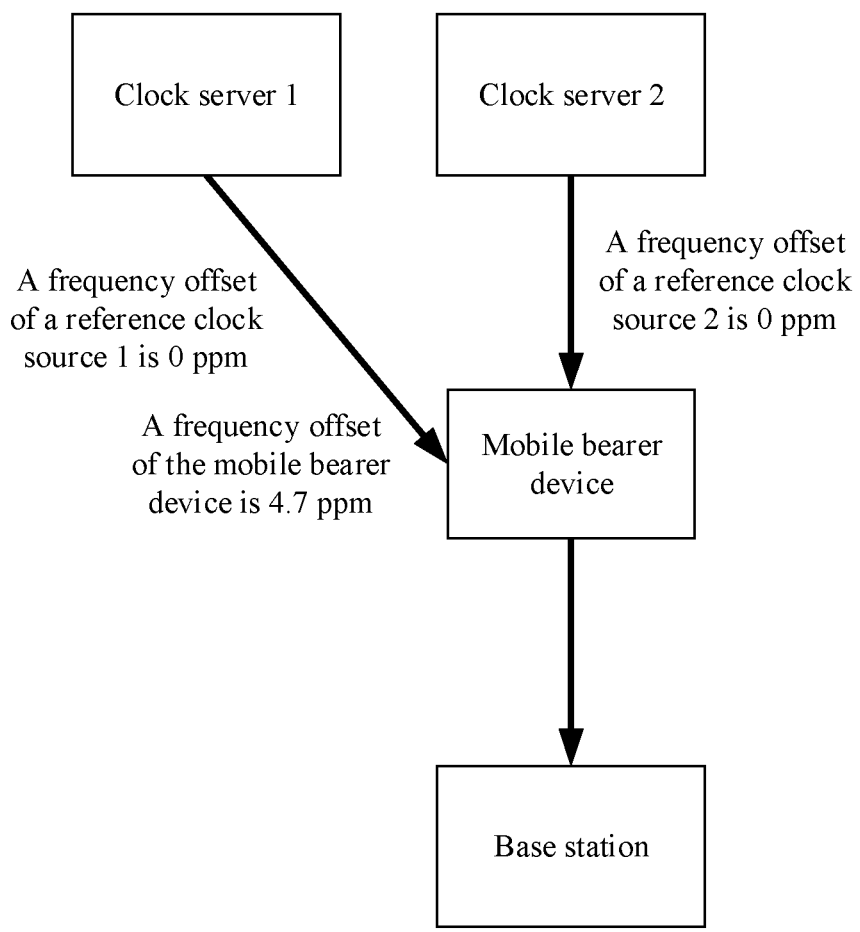
FIG. 4 is a schematic diagram of an application scenario according to an embodiment of the present disclosure.

(1) For a network device that supports physical layer clock synchronization or precision time protocol synchronization, if frequency offset detection values between received at least two clocks and a local clock exceed a determining threshold (the threshold may be referred to as a frequency offset threshold, a frequency offset threshold of the network device, or a frequency offset detection threshold of the mobile bearer device, and a range of the threshold is $\pm 4.6$ ppm), it is considered that a clock of a local device is faulty. In a general scenario, there is a relatively low probability that two or more reference clock sources are faulty at the same time. As shown in FIG. 4, if a frequency offset detection value offset 1 of a clock of a reference clock source 1 relative to the local clock is 4.7 ppm, and a frequency offset detection value offset 2 of a clock of a reference clock source 2 relative to the local clock is 4.7 ppm, both the offset 1 and the offset 2 exceed the frequency offset threshold. In this case, the mobile bearer device determines that the local clock is faulty.

Figure 5:
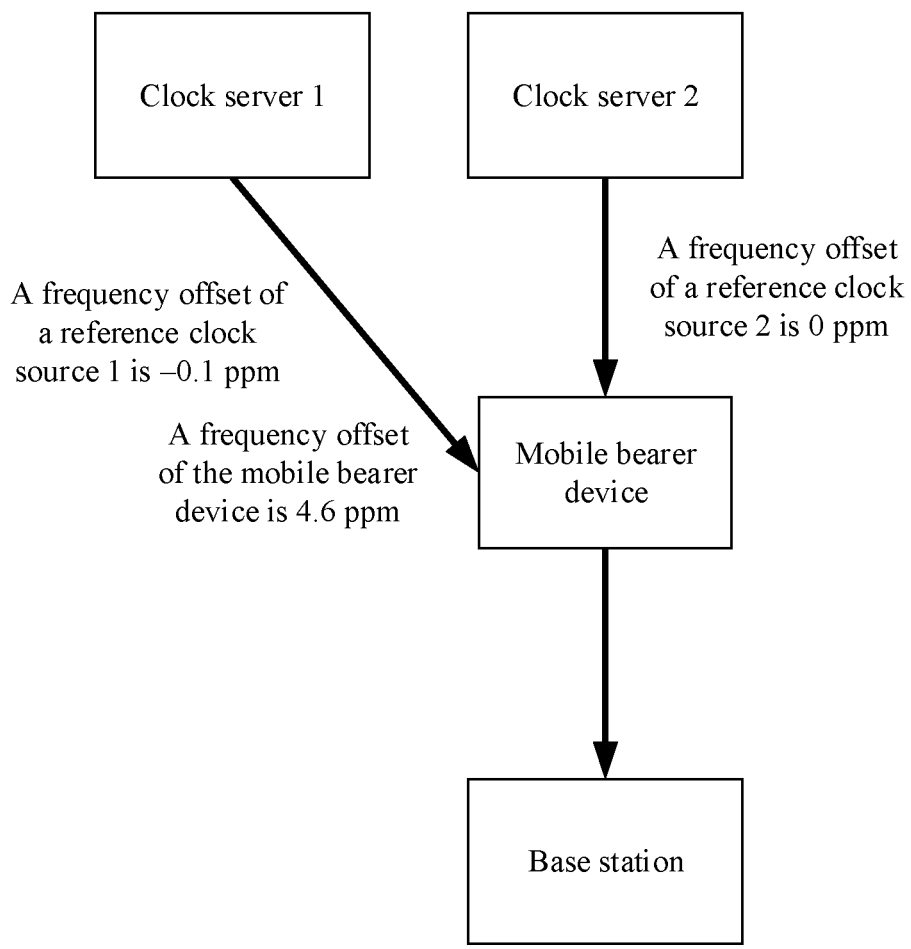
FIG. 5 is a schematic diagram of an application scenario according to an embodiment of the present disclosure.

(2) If in the received at least two clocks, a frequency offset between the clock of the reference clock source 1 and the local clock exceeds the frequency offset threshold, but a frequency offset between the local clock and each of clocks of other reference clock sources does not exceed the frequency offset threshold, the network device determines that the clock of the reference clock source 1 is faulty. There is a relatively low probability that the local clock and a clock of another reference clock source are faulty at the same time. As shown in FIG. 5, the mobile bearer device receives clocks of two clock servers. A frequency offset between the clock of the reference clock source 1 and a standard clock deteriorates to −0.1 ppm, and a frequency offset between the local clock of the mobile bearer device and the standard clock is 4.6 ppm. In this case, a frequency offset detection value offset 1 of the clock of the reference clock source 1 relative to the local clock is 4.7 ppm (which exceeds the frequency offset threshold), and a frequency offset detection value offset 2 of the reference clock source 2 relative to the local clock is 4.6 ppm (which does not exceed the frequency offset threshold). The network device determines that the received clock of the reference clock source 1 is faulty.

It should be understood that the frequency offset of the clock of the reference clock source 1 relative to the local clock has a same meaning as the frequency offset between the reference clock source 1 and the local clock. In FIG. 4, for example, the offset 1 may be: 4.7−0=4.7 ppm, or the offset 1 may be: 0−4.7=−4.7 ppm. Both 4.7 ppm and −4.7 ppm exceed $\pm 4.6$ ppm.

FIG. 4 and FIG. 5 show only two reference clock sources, but there are not limited to two reference clock sources, and there may be three or more reference clock sources. When there are three or more reference clock sources, if a frequency offset between the local clock and each of clocks of all reference clock sources exceeds the frequency offset threshold, or a frequency offset between the local clock and each of clocks of most reference clock sources (for example, over 50% of the reference clocks) exceeds the frequency offset threshold, the mobile bearer device determines that the local clock is faulty.

Figure 6:
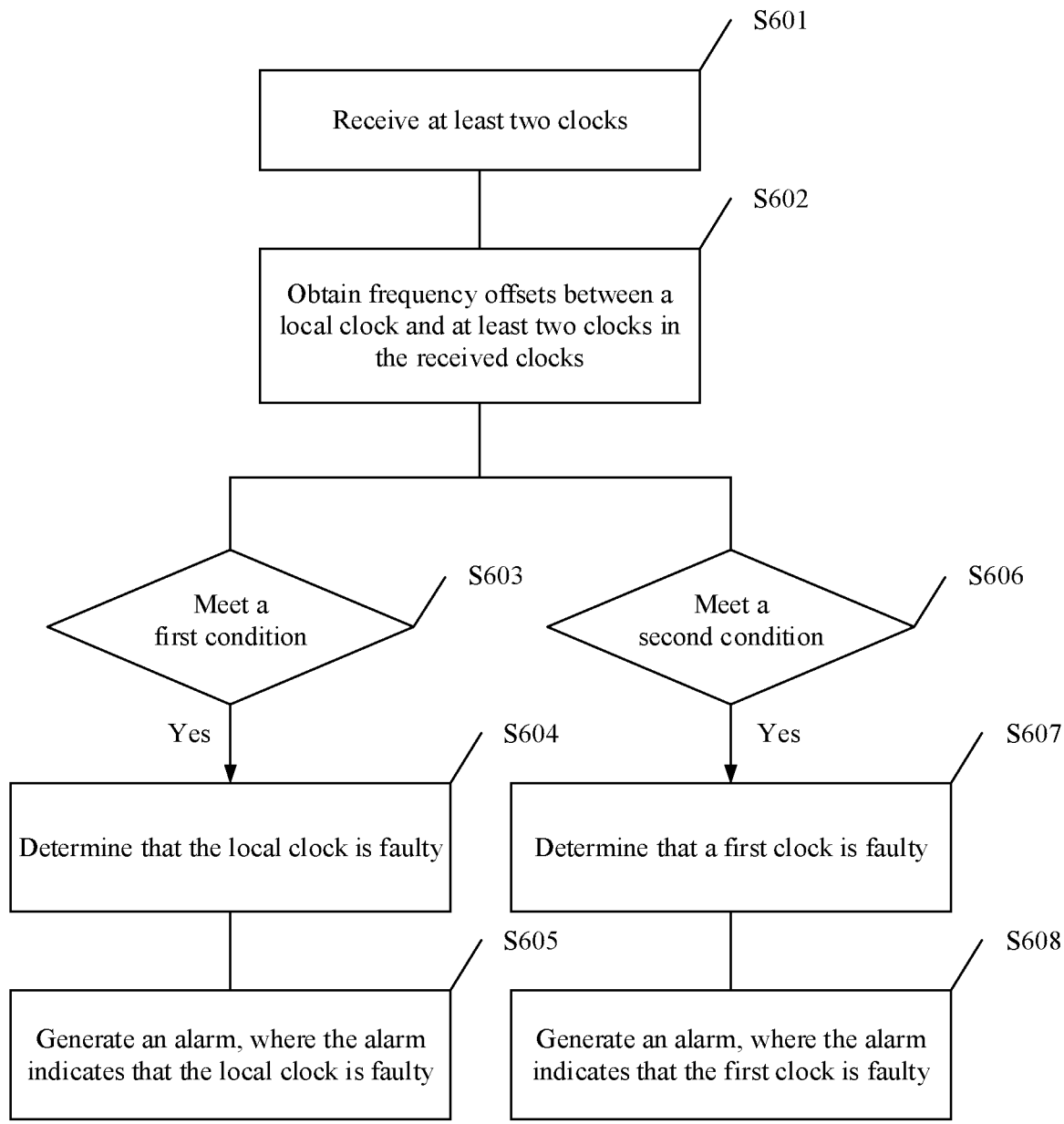
FIG. 6 is a schematic flowchart according to an embodiment of the present disclosure.

The following describes the foregoing solution in detail with reference to FIG. 6. A method in FIG. 6 is performed by a network device. The network device may be a device that supports physical layer clock synchronization or a device that supports precision time protocol synchronization. The network device is connected to at least two reference clock sources.

S601: The network device receives at least two clocks.

The network device receives clock signals from the at least two reference clock sources, as shown in FIG. 4 or FIG. 5.

S602: The network device obtains frequency offsets between a local clock and at least two clocks in the received clocks.

For example, if the network device is connected to 50 reference clock sources and receives 50 clock signals, when locating a clock fault source, the network device may determine, based on a processing capability of the network device, whether to consider all 50 clock signals or consider a part of the 50 clock signals, for example, 40 clock signals.

For example, if the network device has a relatively strong processing capability, all the 50 clocks are considered. In this case, the network device calculates frequency offsets between the local clock and the 50 clocks, that is, calculates an offset 1, an offset 2, . . . , and an offset 50.

S603: The network device determines whether a first condition is met. The first condition includes that a first quantity is greater than a second quantity, the first quantity is a quantity of clocks that are in the considered at least two clocks and whose frequency offsets relative to the local clock exceed a frequency offset threshold, and the second quantity is a quantity of clocks that are in the considered at least two clocks and whose frequency offsets relative to the local clock do not exceed the frequency offset threshold. If the first condition is met, S604 is performed.

S604: The network device determines that the local clock is faulty.

In S603 and S604, the network device may compare each of the calculated 50 offsets with the frequency offset threshold, to determine whether the 50 offsets exceed the frequency offset threshold. For example, when a period for the network device to detect the frequency offset of the clock is 900 seconds, the frequency offset threshold may be set to ±4.6 ppm. For example, if the quantity of clocks whose frequency offsets exceed the frequency offset threshold is 48 and the quantity of clocks whose frequency offsets do not exceed the frequency offset threshold is 2 in the considered 50 clocks, the network device determines that the local clock is faulty. For another example, if the quantity of clocks whose frequency offsets exceed the frequency offset threshold is 50 and the quantity of clocks whose frequency offsets do not exceed the frequency offset threshold is 0 in the 50 clocks, in other words, the frequency offsets between all the 50 clocks and the local clock exceed the frequency offset threshold, the network device determines that the local clock is faulty.

S605: The network device generates an alarm, where the alarm indicates that the local clock is faulty.

For example, the network device sends an alarm to a network management system, where the alarm indicates that the local clock of the network device is faulty. Alternatively, the network device may record, in a log, that the local clock is faulty.

S606: The network device determines whether a second condition is met. The second condition includes that a frequency offset between the first clock and the local clock exceeds the frequency offset threshold, and a frequency offset between the local clock and each clock in the at least two clocks other than the first clock does not exceed the frequency offset threshold. If the second condition is met, S607 is performed.

S607: The network device determines that the first clock is faulty.

In S606 and S607, the network device may compare each of the calculated 50 offsets with the frequency offset threshold, to determine whether the 50 offsets exceed the frequency offset threshold. For ease of description, the considered 50 clocks are numbered 1, 2, 3, . . . , and 50. If an offset 3 of the clock 3 exceeds the frequency offset threshold, but offsets of the other 49 clocks do not exceed the frequency offset threshold, the network device determines that the clock 3 (namely, the first clock) is faulty.

S608: The network device generates an alarm, where the alarm indicates that the first clock is faulty.

For example, the network device sends an alarm to the network management system, where the alarm indicates that the clock 3 is faulty. Alternatively, the network device may record, in a log, that the clock 3 is faulty.

It should be noted that there may be an "or" relationship between that the network device determines whether a first condition is met and that the network device determines whether a second condition is met. To be specific, the network device determines only whether the first condition is met, and does not consider whether the second condition is met, or determines only whether the second condition is met, and does not consider whether the first condition is met. For another example, there may be an "and" relationship between determining whether the first condition is met and determining whether the second condition is met. For example, at a first time point, the 50 clocks considered by the network device meet the first condition, and at a second time point, the 50 clock signals change, and meet the second condition. If the network device determines that the first condition is met at the first time point, and determines that the second condition is met at the second time point, there is the "and" relationship between determining whether the first condition is met and determining whether the second condition is met.

The foregoing local clock may be a clock generated by a local crystal oscillator.

In the solution according to the embodiment shown in FIG. 6, the network device may locate a clock fault source, that is, determine whether the local clock is faulty or a received clock is faulty, and may further generate an alarm to indicate the clock fault source. This helps quickly troubleshoot a clock fault.

Figure 3:
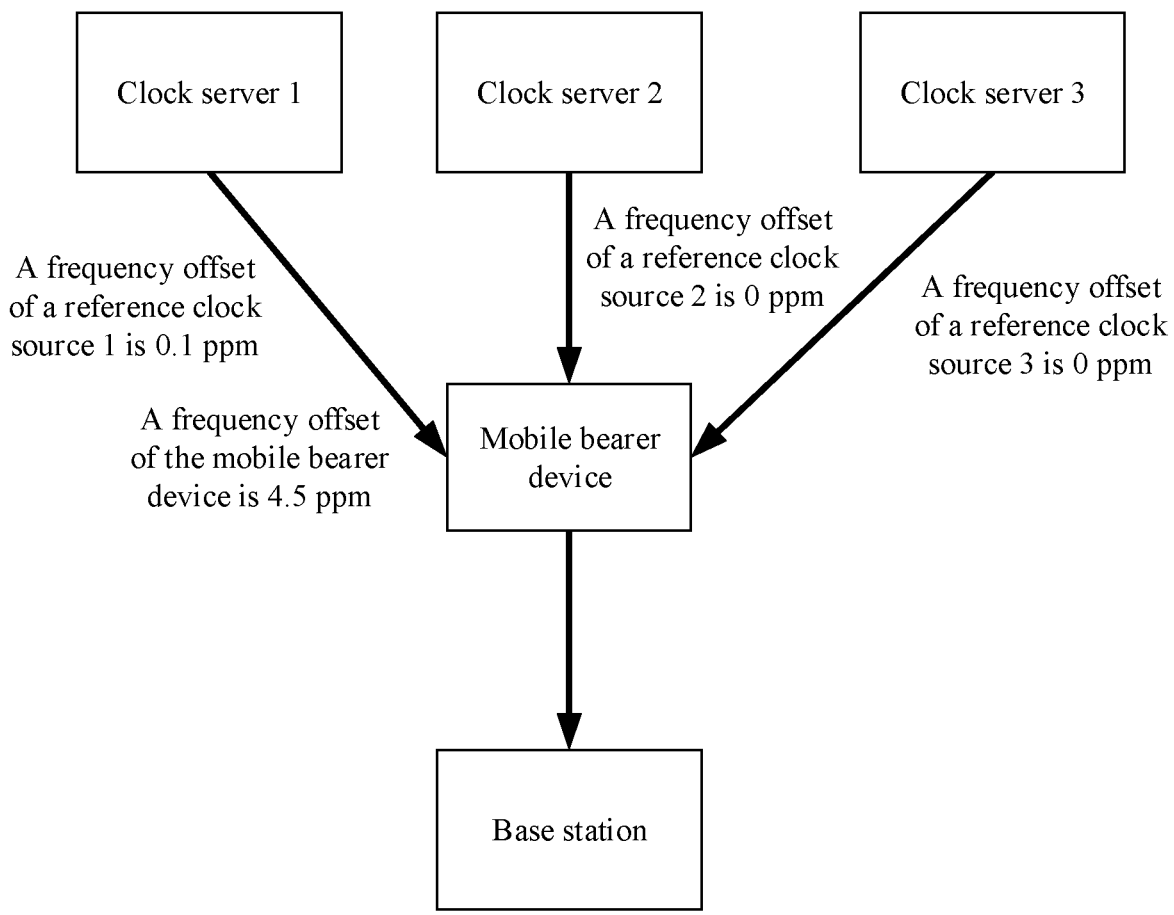
FIG. 3 is a schematic diagram of an application scenario according to an embodiment of the present disclosure.

The present disclosure further provides another embodiment, to resolve a problem that a service fault of a base station is caused by relatively low precision of a frequency offset threshold (for example, ±4.6 ppm) of a network device. As shown in FIG. 3, the mobile bearer device receives clocks from clock servers 1 to 3. When the clock of the clock server 1 deteriorates slightly (for example, a frequency offset of the clock relative to a standard clock is 0.1 ppm), the mobile bearer device detects that a frequency offset of a clock of a reference clock source 1 relative to a local clock is 4.4 ppm (which may be denoted as follows: offset 1=4.5−0.1=4.4 ppm), and a frequency offset of a clock of a reference clock source 2 relative to the local clock and a frequency offset of a clock of a reference clock source 3 relative to the local clock are both 4.5 ppm (which may be denoted as follows: offset 2=4.5−0=4.5 ppm, and offset 3=4.5−0=4.5 ppm). In this case, the mobile bearer device determines that none of the frequency offsets of the clocks of the reference clock sources 1 to 3 exceeds a frequency offset threshold (for example, ±4.6 ppm) of the mobile bearer device. It is assumed that quality levels of the clock server 1, the clock server 2, and the clock server 3 are all primary reference clocks (PRCs), but a priority of the reference clock source 1 is higher than a priority of the reference clock source 2 and a priority of the reference clock source 3. The mobile bearer device chooses to trace the reference clock source 1. Therefore, a frequency offset, relative to the standard clock, of a clock sent by the mobile bearer device to a base station device is also about 0.1 ppm. However, the base station requires that a frequency offset of a clock does not exceed ±0.05 ppm. Therefore, the base station becomes faulty in this scenario.

In a scenario in FIG. 3, after receiving a plurality of clocks, the network device may calculate frequency offsets (which may be referred to as a relative frequency offset (relativeoffset) or a relative reference offset) between the plurality of received clocks. If a frequency offset between a clock and each of the other received clocks exceeds a relative frequency offset threshold, it may be determined that the clock is faulty.

Figure 7:
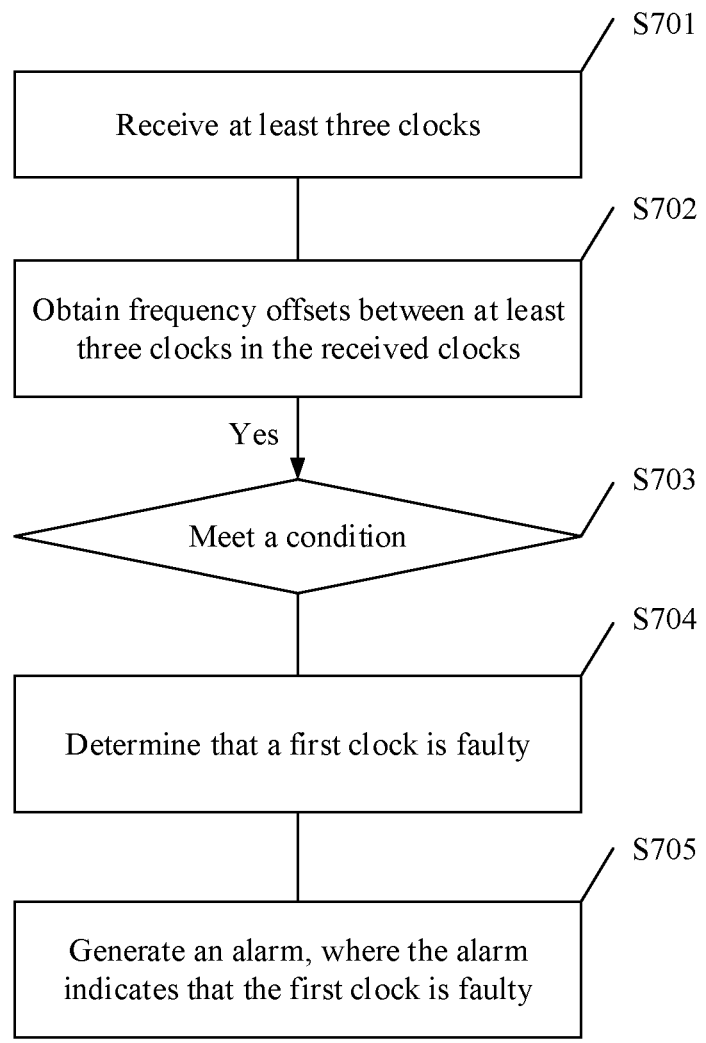
FIG. 7 is a schematic flowchart according to an embodiment of the present disclosure.

The following describes the foregoing process of determining a clock fault source by determining whether a relative frequency offset exceeds a relative frequency offset threshold with reference to FIG. 7. A method in FIG. 7 is performed by a network device. The network device may be a device that supports physical layer clock synchronization or a device that supports precision time protocol synchronization. The network device is connected to at least three reference clock sources.

S701: The network device receives at least three clocks.

For example, as shown in FIG. 3, the network device receives clocks from clock servers 1 to 3 (namely, reference clock sources 1 to 3).

S702: The network device obtains frequency offsets between at least three clocks in the received clocks.

As described in the embodiment shown in FIG. 6, when locating a clock fault source, the network device may determine, based on a processing capability of the network device, whether to consider all received clock signals or consider a part of the received clock signals. The following provides description by using an example in which three clocks are received and three clock signals are considered.

The network device may separately calculate frequency offsets between the three clocks (that is, calculates three relative frequency offsets).

For example, the network may use two methods to calculate the frequency offsets between the three clocks.

Method 1: In the scenario in FIG. 3, the network device separately measures an offset 1=4.4 ppm, an offset 2=4.5 ppm, and an offset 3=4.5 ppm according to S602 in FIG. 6. Then, the network device calculates the frequency offsets between the three clocks (the relative frequency offsets):

Relativeoffset 12=Offset 1−Offset 2=−0.1 ppm

Relativeoffset 13=Offset 1−Offset 3=−0.1 ppm

Relativeoffset 23=Offset 2−Offset 3=0 ppm

It should be understood that the network device may alternatively calculate the frequency offsets between the clocks:

Relativeoffset 12=Offset 2−Offset 1=0.1 ppm

Relativeoffset 13=Offset 3−Offset 3=0.1 ppm

Relativeoffset 23=Offset 3−Offset 2=0 ppm

Method 2: The network device directly measures the frequency offsets between the three clocks:

Relativeoffset 12=0.1−0=0.1 ppm

Relativeoffset 13=0.1−0=0.1 ppm

Relativeoffset 23=0−0=0 ppm

It should be understood that the network device may alternatively measure the frequency offsets between the clocks:

Relativeoffset 12=0−0.1=−0.1 ppm

Relativeoffset 13=0−0.1=−0.1 ppm

Relativeoffset 23=0−0=0 ppm

S703: Determine whether a condition is met. If the condition is met, S704 is performed. The condition includes that a frequency offset between the first clock and each of other clocks in a plurality of clocks exceeds a relative frequency offset threshold, and the first clock is one of the plurality of clocks.

S704: Determine that the first clock is faulty.

In S703 and S704, each of the Relativeoffset 12, Relativeoffset 13, and Relativeoffset 23 may be compared with the relative frequency offset threshold to determine whether the Relativeoffset exceeds the relative frequency offset threshold. The relative frequency offset threshold may also be referred to as a frequency offset detection threshold of a reference clock source, or a frequency offset detection threshold of a clock source. For example, the following two scenarios may be considered when the relative frequency offset threshold is set.

Scenario 1: If the network device is connected to the clock server through one hop, as shown in FIG. 2 to FIG. 5, the relative frequency offset threshold may be set to ±2×0.03 ppb (a corresponding detection period is 900 seconds) or ±2×10$^{-5}$ ppm (which corresponds to a long-term detection period). Based on a requirement of the ITU-T G.811 standard, if the reference clock source is a PRC, precision of a clock frequency offset of the PRC should not exceed 0.03 ppb (a corresponding detection period is 900 seconds) or ±10$^{-5}$ ppm (which corresponds to a long-term detection period). Therefore, the relative frequency offset threshold may be set to ±0.06 ppb (a corresponding detection period is 900 seconds) or ±2×10$^{-5}$ ppm (which corresponds to a long-term detection period).

Figure 8:
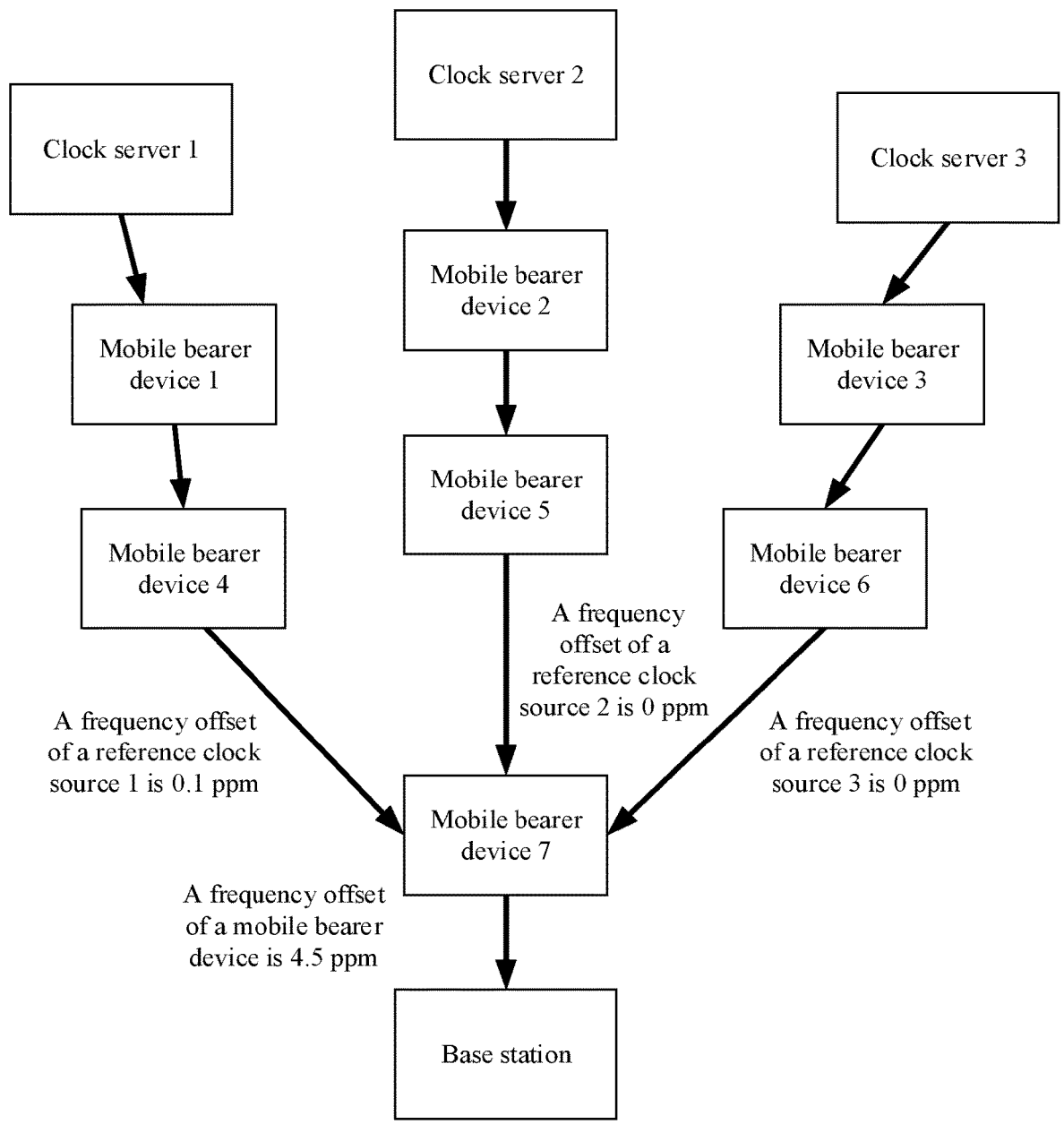
FIG. 8 is a schematic diagram of an application scenario according to the present disclosure.
Figure 9:
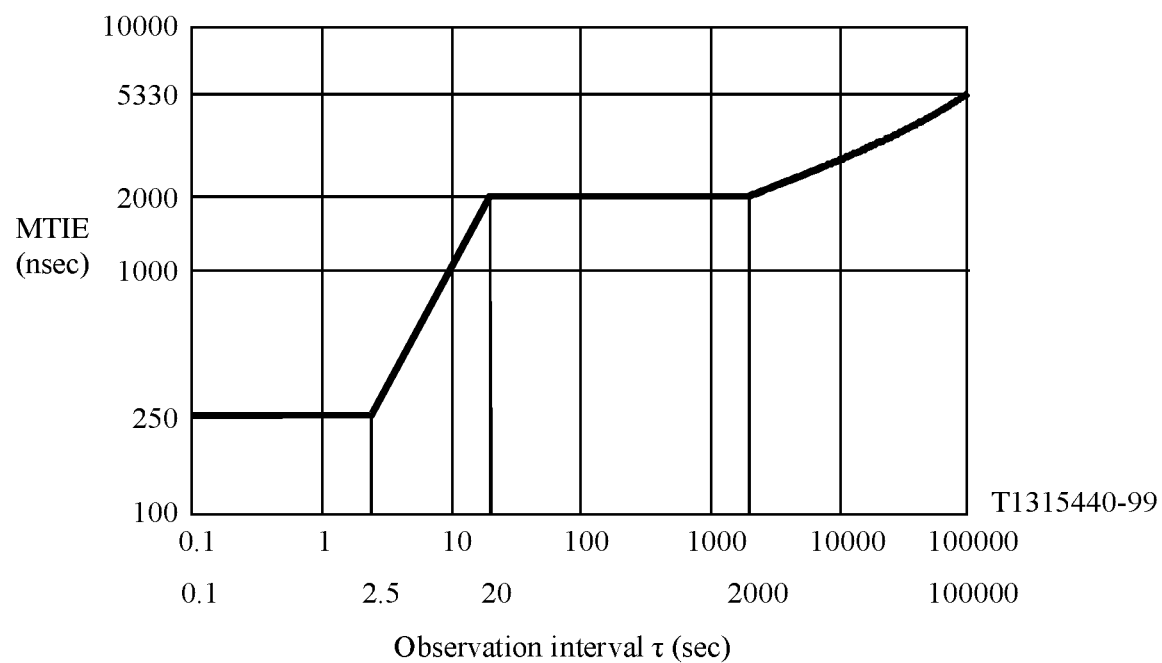
FIG. 9 is a schematic diagram of an output requirement of a clock frequency offset.

Scenario 2: If the network device is connected to the clock server through a mobile bearer network, in other words, another mobile bearer device further exists between the clock server and a mobile bearer device, the relative frequency offset threshold may be set to ±4.44 ppb. As shown in FIG. 8, a mobile bearer device 1 and a mobile bearer device 4 exist between the clock server 1 and a mobile bearer device 7, a mobile bearer device 2 and a mobile bearer device 5 exist between the clock server 2 and the mobile bearer device 7, and a mobile bearer device 3 and a mobile bearer device 6 exist between the clock server 3 and the mobile bearer device 7. For the mobile bearer device 7, there are three reference clock sources (which are the mobile bearer device 4, the mobile bearer device 5, and the mobile bearer device 6). According to the ITU-T G.8261 standard, performance of a clock output by any mobile bearer device (for example, both the mobile bearer device 1 and the mobile bearer device 4 trace the clock server 1) that traces a device (for example, the clock server 1) whose clock level is a PRC should meet a requirement of the following maximum time interval error (MTIE) (referring to FIG. 9). The requirement of the maximum time interval error is converted into a requirement of a frequency offset as follows. A frequency offset of the clock output by the mobile bearer device relative to a standard clock (for example, a GPS clock) should not exceed ±0.02 ppm (a corresponding detection period is 100 seconds), not exceed ±0.002 ppm (a corresponding detection period is 100 seconds), or not exceed ±2.22 ppb (a corresponding detection period is 900 seconds). Therefore, the relative frequency offset threshold may be set to 2x±2.22 ppb=±4.44 ppb (a corresponding detection period is 900 s). Alternatively, the relative frequency offset threshold is ±4.44 ppb.

It can be learned that whether the relative frequency offset threshold is ±0.06 ppb, ±2×10$^{-5}$ ppm, or ±4.44 ppb, precision of the relative frequency threshold is far higher than a frequency offset threshold (for example, ±4.6 ppm) of the mobile bearer device. Because precision required by a base station service is 0.05 ppm, precision of the foregoing two relative frequency offset thresholds can meet the requirement of the base station service.

For example, in an example shown in FIG. 3, the relative frequency offset threshold may be set to ±0.06 ppb, and the frequency offset of the clock of the reference clock source 1 relative to the clock of the reference clock source 2 and the frequency offset of the clock of the reference clock source 1 relative to the clock of the reference clock source 3 both exceed the relative frequency offset threshold. Therefore, the mobile bearer device in FIG. 3 determines that the clock of the reference clock source 1 (namely, the first clock) is faulty.

In an example shown in FIG. 8, the relative frequency offset threshold may be set to ±4.44 ppb. According to the foregoing method, the mobile bearer device 7 may still determine that the clock of the reference clock source 1 is faulty.

In a possible implementation, the condition in S703 further includes that none of the frequency offsets between the other clocks exceeds the relative frequency offset threshold. Further, the condition is met only when a frequency offset between any two clocks in the other clocks does not exceed the relative frequency offset threshold. In the scenario shown in FIG. 3, the other clocks are the clocks of the reference clock source 2 and the reference clock source 3. Relativeoffset 23 is equal to 0 ppm and does not exceed the relative frequency offset threshold. In this way, it can be more accurately determined that only the clock of the reference clock source 1 is faulty.

S705: The network device generates an alarm, where the alarm indicates that the first clock is faulty.

For details, refer to the description in S608. Details are not described herein again.

It can be learned that, in the solution of the embodiment in FIG. 8, even if frequency offsets of all input clocks relative to a local clock do not exceed the frequency offset threshold (for example, ±4.6 ppm) of the mobile bearer device, if a frequency offset of one input clock relative to the other input clocks exceeds the relative frequency offset threshold (for example, ±0.06 ppb or ±4.44 ppb), the network device can still locate the fault source and generate an alarm in time. This helps quickly troubleshoot a base station fault. Based on the solution in the embodiment in FIG. 8, precision of detecting a frequency offset of a clock input by the network device is improved.

The network device may choose, through configuration, to execute only the solution in the embodiment in FIG. 6, or execute only the solution in the embodiment in FIG. 8, or execute both the solutions in the embodiments in FIG. 6 and FIG. 8.

The embodiments of the present disclosure are also applied to other fields that require clock synchronization, for example, electric power and media. The fields also require clock synchronization, and a clock synchronization solution may be consistent with the clock synchronization solution in each embodiment of the present disclosure.

The mobile bearer device in the foregoing embodiment may be a router or a switch, or may be an optical transport network (OTN) device or a synchronous digital hierarchy (SDH) device, or may be a microwave device, or may be a passive optical network (PON) device or a digital subscriber line (DSL) device.

Figure 10:
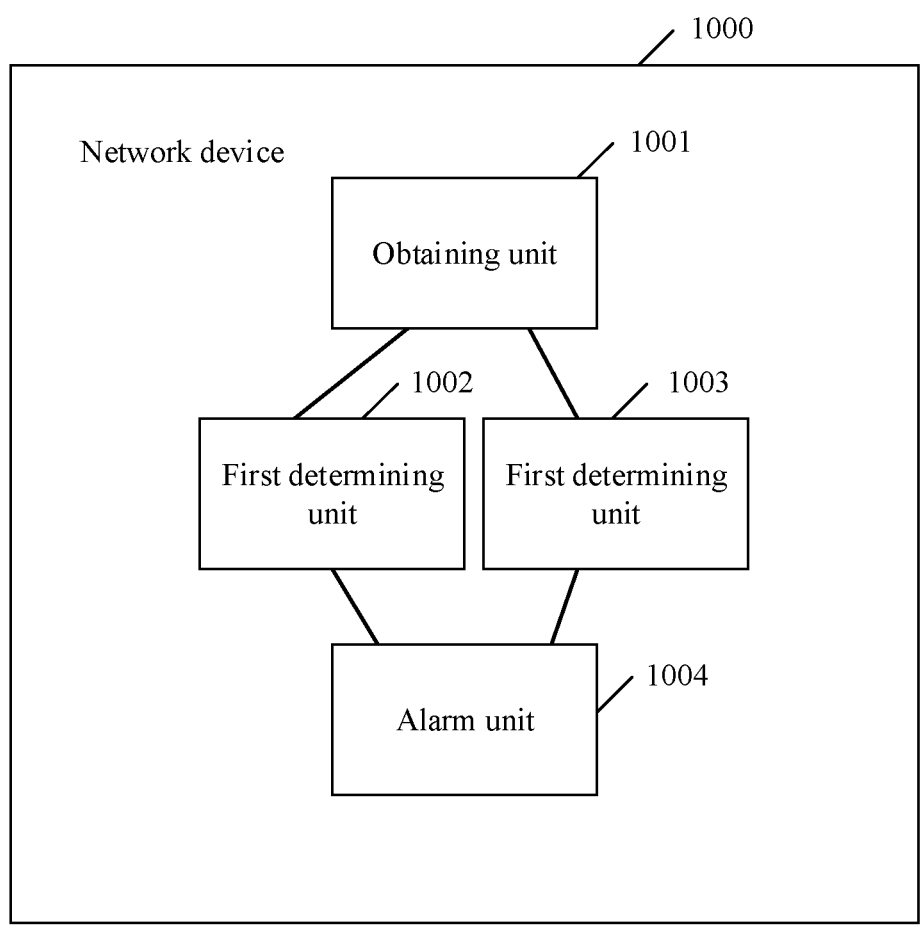
FIG. 10 is a schematic structural diagram of a network device.

FIG. 10 is a schematic structural diagram of a network device 1000. The network device 1000 may be the mobile bearer device in FIG. 1 to FIG. 5 and FIG. 8, or may be the network device in FIG. 6 and FIG. 7. The network device 1000 includes an obtaining unit 1001, and further includes a first determining unit 1002 and/or a second determining unit 1003. The obtaining unit 1001 may be configured to perform S601 and S602 in FIG. 6. The first determining unit 1002 may be configured to perform S603 and S604 in FIG. 6. The second determining unit 1003 may be configured to perform S606 and S607 in FIG. 6. The network device 1000 may further include an alarm unit 1004, configured to perform S605 or S608 in FIG. 6. For detailed description, refer to the description of the corresponding steps in the embodiment in FIG. 6. Details are not described herein again.

Figure 11:
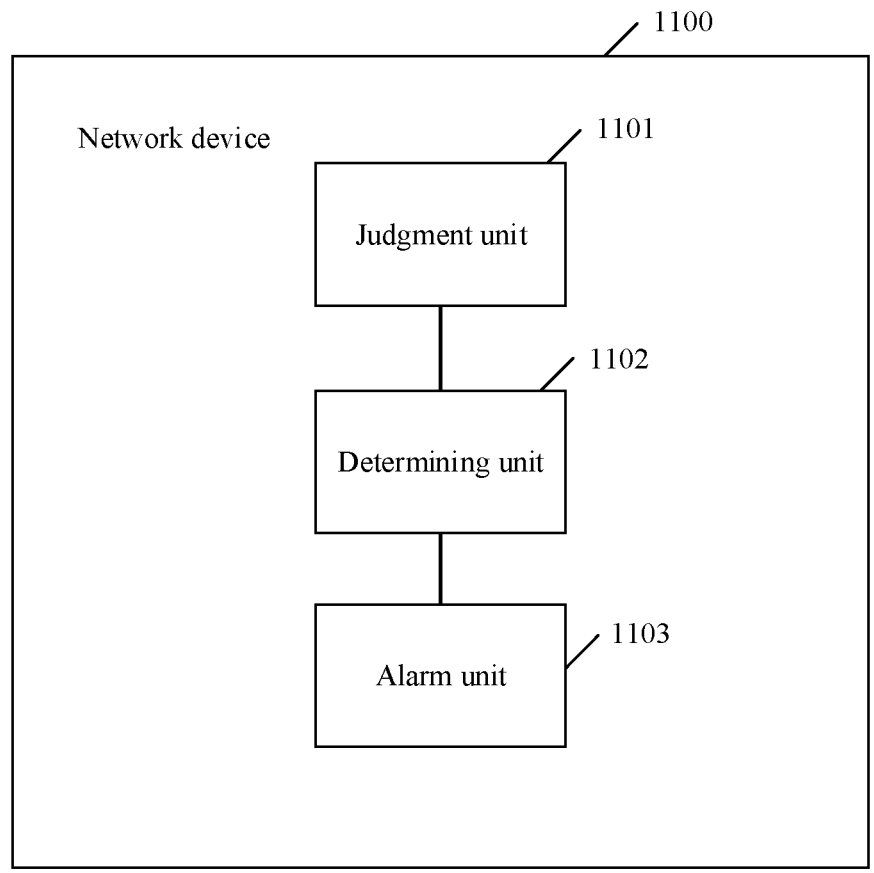
FIG. 11 is a schematic structural diagram of a network device.

FIG. 11 is a schematic structural diagram of a network device 1100. The network device 1100 may be the mobile bearer device in FIG. 1 to FIG. 5 and FIG. 8, or may be the network device in FIG. 6 and FIG. 7. The network device 1100 may include a judgment unit 1101 and a determining unit 1102. The judgment unit 1101 is configured to perform S702 and S703 in FIG. 7. The determining unit 1102 is configured to perform S704 in FIG. 7. The network device 1100 may further include an alarm unit 1103, configured to perform S705 in FIG. 7. For detailed description, refer to the description of the corresponding steps in the embodiment in FIG. 6. Details are not described herein again.

Figure 12:
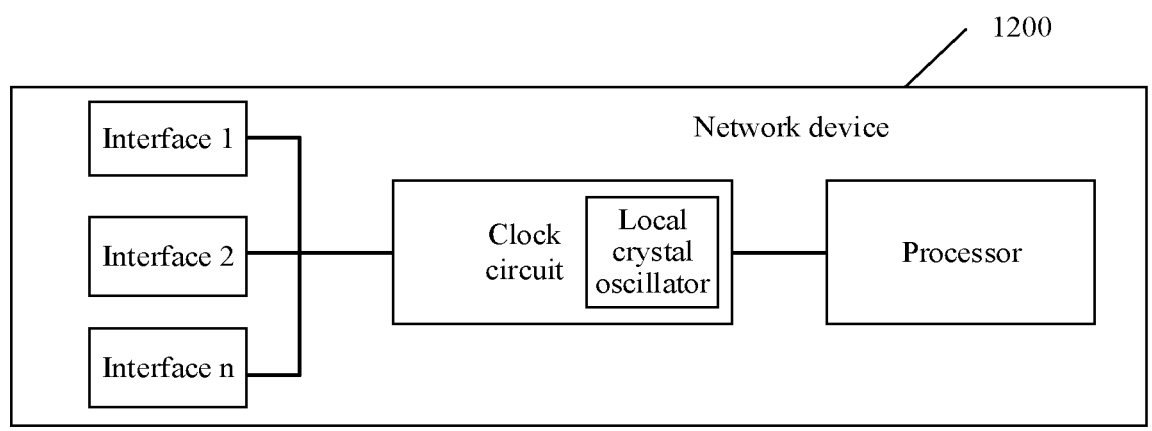
FIG. 12 is a schematic structural diagram of a network device.

FIG. 12 is a schematic structural diagram of a network device 1200. The network device 1200 may be the mobile bearer device in FIG. 1 to FIG. 5 and FIG. 8, or may be the network device in FIG. 6 and FIG. 7. The network device 1200 includes at least two interfaces, a clock circuit, and a processor. A plurality of interfaces of the network device may be distributed on a plurality of interface cards, and each interface card may have a plurality of interfaces. There may be one or more processors. The clock circuit may include a local crystal oscillator. Alternatively, the local crystal oscillator may be independent of the clock circuit.

The network device 1200 is connected to a plurality of reference clock sources, and receives clocks of the plurality of reference clock sources. In this way, the interface of the network device 1200 executes an action of receiving a clock in FIG. 6 or FIG. 7. Referring to the description in S602 or S702, the network device 1200 may consider processing all received clocks, or may consider processing only a part of the received clocks. A clock received by each interface is sent to the clock circuit. The clock circuit and the processor may execute the following several optional actions.

1. The clock circuit may perform S602 in FIG. 6. That is, the clock circuit obtains frequency offsets between at least two clocks in the received clocks and a local crystal oscillator, and then sends the frequency offsets to the processor. The processor may perform S603 and S604, and/or S606 and S607. Further, the processor may perform S605 or S608, and a generated alarm may be sent to a network management device through an interface.

2. The clock circuit may perform S702 in FIG. 7. That is, the clock circuit obtains frequency offsets between at least three clocks in the received clocks (refer to the description of method 2 in S702), and then sends the frequency offsets to the processor. The processor performs S703 and S704. Further, the processor may perform S705, and a generated alarm may be sent to a network management device through an interface.

3. The clock circuit may perform method 1 in S702 in FIG. 7. That is, the clock circuit obtains frequency offsets between at least three clocks in the received clocks and a local crystal oscillator, and then sends the frequency offsets to the processor. The processor performs a remaining part in method 1 in S702, to obtain the frequency offsets between the at least three clocks in the received clocks. Then, the processor performs S703 and S704. Further, the processor may perform S705, and a generated alarm may be sent to a network management device through an interface.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on an actual requirement to achieve objectives of the solutions of the embodiments. In addition, in the accompanying drawings of the embodiments of a first network node or a controller provided in the present disclosure, connection relationships between modules indicate that the modules have communication connections with each other, and the communication connection may be implemented as one or more communications buses or signal lines. A person of ordinary skill in the art may understand and implement the embodiments of the present disclosure without creative efforts.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (ASIC).

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method, comprising:
    obtaining first frequency offsets between at least two clocks and a local clock;
    determining that the local clock is faulty when a first condition is met, wherein the first condition comprises that a first quantity is greater than a second quantity, wherein the first quantity is of first clocks that are in the at least two clocks and that have second frequency offsets relative to the local clock exceeding a frequency offset threshold, and wherein the second quantity is of second clocks that are in the at least two clocks and that have third frequency offsets relative to the local clock not exceeding the frequency offset threshold; and
    determining that a third clock in the at least two clocks is faulty when a second condition is met,
    wherein the second condition comprises that a fourth frequency offset between the third clock and the local clock exceeds the frequency offset threshold and a fifth frequency offset between the local clock and each fourth clock in the at least two clocks other than the third clock does not exceed the frequency offset threshold.

2. The method of claim 1, wherein the second quantity is 0, and wherein the first quantity is a third quantity of the at least two clocks.

3. The method of claim 1, wherein the at least two clocks comprise three or more clocks.

4. The method of claim 1, wherein the frequency offset threshold is ±4.6 parts per million (ppm).

5. The method of claim 1, further comprising supporting either a physical layer clock synchronization or a precision time protocol synchronization.

6. The method of claim 1, further comprising generating an alarm indicating a clock fault source.

7. A network device, comprising:
    an interface configured to receive at least two clocks;
    a clock circuit coupled to the interface and configured to obtain first frequency offsets between the at least two clocks and a local clock; and
    one or more processors coupled to the clock circuit and configured to:
        determine that the local clock is faulty when a first condition is met, wherein the first condition comprises that a first quantity is greater than a second quantity, wherein the first quantity is of first clocks that are in the at least two clocks and having second frequency offsets relative to the local clock exceeding a frequency offset threshold, and wherein the second quantity is of second clocks that are in the at least two clocks and having third frequency offsets relative to the local clock not exceeding the frequency offset threshold; and determine that a third clock in the at least two clocks is faulty when a second condition is met, wherein the second condition comprises that a fourth frequency offset between the third clock and the local clock exceeds the frequency offset threshold and a fifth frequency offset between the local clock and each fourth clock in the at least two clocks other than the third clock that does not exceed the frequency offset threshold.

8. The network device of claim 7, wherein the second quantity is 0 and the first quantity is a third quantity of the at least two clocks.

9. The network device of claim 7, wherein the at least two clocks comprise three or more clocks.

10. The network device of claim 7, wherein the frequency offset threshold is +4.6 parts per million (ppm).

11. The network device of claim 7, wherein the network device supports either a physical layer clock synchronization or a precision time protocol synchronization.

12. The network device of claim 7, wherein the one or more processors are further configured to generate an alarm indicating a clock fault source.

13. A computer program product comprising computer-executable instructions that are stored on a non-transitory computer readable medium and that, when executed by one or more processors, cause a network device to:

determine that a local clock of the network device is faulty when a first condition is met, wherein the first condition comprises that a first quantity is greater than a second quantity, wherein the first quantity is of first clocks that are in at least two clocks and having first frequency offsets relative to the local clock exceeding a frequency offset threshold, and wherein the second quantity is of second clocks that are in the at least two clocks and having third frequency offsets relative to the local clock not exceeding the frequency offset threshold;

determine that a third clock in the at least two clocks is faulty when a second condition is met, wherein the second condition comprises that a fourth frequency offset between the third clock and the local clock exceeds the frequency offset threshold and a fifth frequency offset between the local clock and each fourth clock in the at least two clocks other than the third clock that does not exceed the frequency offset threshold; and determine that a fifth clock is faulty when a third condition is met, wherein the third condition comprises that a sixth frequency offset between the fifth clock and each of sixth clocks in a plurality of seventh clocks exceeds a relative frequency offset threshold, and wherein the fifth clock is one of the seventh clocks.

14. The computer program product of claim 13, wherein the second quantity is 0, and wherein the first quantity is a third quantity of the at least two clocks.

15. The computer program product of claim 13, wherein the at least two clocks comprise three or more clocks.

16. The computer program product of claim 13, wherein the frequency offset threshold is ±4.6 parts per million (ppm).

17. The computer program product of claim 13, wherein the network device supports either a physical layer clock synchronization or a precision time protocol synchronization.

18. The computer program product of claim 13, wherein the computer-executable instructions further cause the network device to generate an alarm indicating a clock fault source.

* * * * *

UNITED STATES PATENT AND TRADEMARK OFFICE
CERTIFICATE OF CORRECTION

PATENT NO. : 12,245,180 B2
APPLICATION NO. : 17/827189
DATED : March 4, 2025
INVENTOR(S) : Yawei Zhang, Jingfei Lv and Yong Cheng Page 1 of 1

It is certified that error appears in the above-identified patent and that said Letters Patent is hereby corrected as shown below:

In the Claims

Claim 10, Column 17, Line 20: "threshold is +4.6 parts" should read "threshold is ±4.6 parts"

Signed and Sealed this
Twenty-ninth Day of April, 2025

Coke Morgan Stewart
*Acting Director of the United States Patent and Trademark Office*